United States Patent [19]

Lindsay, Jr.

[11] 3,993,410

[45] Nov. 23, 1976

[54] ROD RETAINER

[75] Inventor: Ernest Harold Lindsay, Jr., Mokena, Ill.

[73] Assignee: Illinois Tool Works Inc., Chicago, Ill.

[22] Filed: Sept. 11, 1975

[21] Appl. No.: 612,410

[52] U.S. Cl. .................................. 403/13; 403/71
[51] Int. Cl.$^2$ .................................. F16C 11/00
[58] Field of Search ............... 403/69, 71, 195, 163, 403/206, 13, 14

[56] References Cited

UNITED STATES PATENTS

| | | | |
|---|---|---|---|
| 3,231,300 | 1/1966 | Moroney | 403/163 |
| 3,401,960 | 9/1968 | Saunders | 403/206 |
| 3,679,249 | 7/1972 | Hoffmann | 403/69 |
| 3,695,652 | 10/1972 | Ratnikas | 403/69 |

*Primary Examiner*—Andrew V. Kundrat
*Attorney, Agent, or Firm*—J. R. Halvorsen; R. W. Beart

[57] ABSTRACT

A one-piece plastic fastener for connecting a right angled actuating rod to a lever member. The fastener includes a base member having a rod receiving aperture at one end; a retaining means for associating the fastener with the lever member, the retaining means having a bore co-axial with and communicating with the base aperture and an upstanding wall forming a receptacle on the other side of the base member to receive a right angle end of the actuating rod, the inner wall surfaces having a funnel-like configuration to permit blind insertion of the end of the actuating rod into said aperture and communicating bore. A rigid retaining arm overlying said base in space relation to said aperture and resilient finger means forming a throat with said arm to permit insertion of the actuating rod into retained position under said arm when its right angled end is inserted through the aperture and into the bore of the retaining means.

11 Claims, 6 Drawing Figures

ROD RETAINER

BACKGROUND OF THE INVENTION

The present invention represents an improvement over the connecting devices disclosed in W. N. Moroney, U.S. Pat. No. 3,231,300, issued Jan. 25, 1966; T. B. Saunders, U.S. Pat. No. 3,401,960, issued Sept. 17, 1968; and D. R. Hoffmann, U.S. Pat. No. 3,679,249, issued July 25, 1972. The Moroney patent and the Hoffmann patent disclose plastic connecting devices in which the right angled end of an actuating rod is pushed through an aperture in the device and retained by one or more shouldered recesses in arms or walls. Generally the removal force is substantially equal to the insertion force and hence does not provide a positive engagement. The Saunders patent required a rotation to bring the body of the rod into alignment with a retention recess. In many instances the assembly operation is carried out blindly, for example, the rod end must be inserted into the retaining device without the worker actually seeing what he is doing. Hence, in the haste of mass assembly many rods when associated with fasteners disclosed in these patents are not firmly seated or brought into proper alignment within the retention means and hence failure in the field necessitates expensive repair jobs. In many instances wherein the retention means is utilized for a door lock actuating rod the entire trim panel including actuating levers for the door handle and windows must be removed to obtain access to the interior of the door mechanism.

An object of the present invention is to provide a connecting means which gives the operator "feel" during insertion of the rod and insures assembly of the rod to the fastening means and further to remove substantially all "play" of the rod relative to the fastening device after installation therein.

SUMMARY OF THE INVENTION

The present invention relates to a connecting device for coupling an elongated actuating rod terminated in a short end portion substantially normal to the balance of the rod to an apertured lever member. The fastener is an integrally molded plastic device provided with a substantially flat rectangular base member having an aperture at one end adapted to receive the right angle end portion of the actuating rod. A suitable retention means extends from one side of the base member and is provided with a bore therethrough co-axial with the base member aperture. While many forms of retaining means or studs are known in the art, the present invention includes a generally cylindrical device slotted axially and provided with an intermediate shoulder rising from the tapered end to retain the fastener in the apertured lever arm. The stud portion or retaining means is resiliently compressible to permit insertion into mounted relation within said lever arm aperture. On the side opposite the retaining means the base member includes an upstanding wall having a generally U-shaped configuration forming a receptacle open at the top and at one end. The base around said aperture is chamfered and said side wall has a tapered inside surface which is substantially a continuation of said chamfer to provide a continuous lead in surface for guiding said rod end portion to the base aperture and into the bore of the retaining means or stud. A substantially rigid retaining arm extends from said base in the same direction as said receptacle but in spaced relation to the aperture and includes a first section extending upwardly from the base and a second section extending cantilever fashion over a substantial portion of the base with the free end of said second section angularly disposed toward said base to form a bight at the intersection of said first and second sections of said arm. A thin resilient finger extends upwardly from the opposite edge of said base in opposition and in space relation to the free end of said arm to form a throat, said throat having a size substantially less than the diameter of the rod to be retained whereby said resilient finger must be moved laterally of said base to permit acceptance of said rod within the throat formed between the finger and the free end of the retaining arm. A preferred embodiment of the invention has the free end of the second section of the retaining arm located on a bias or angulared relationship to the base and as the right angled end portion of the rod is introduced into the aperture and bore the slope portion of the retaining arm serves as a guide until the rod reaches the bias or angled free end of the retaining arm and the finger is deflected whereby the rod is then briefly rotated into retained position.

A further improvement includes a cam surface disposed transversely to the longitudinal edges of the base and in opposition to the retaining arm whereby the rod is guided into the bight portion of the retaining arm to orient the rod and eliminate rattles caused by looseness between the retaining arm and the base.

DESCRIPTION OF THE DRAWINGS

Referring now to the drawings wherein similar parts are designated by similar numerals in the detailed description which follows reference may be had to the drawing in which.

DETAILED DESCRIPTION OF THE INVENTION

Figure 1:
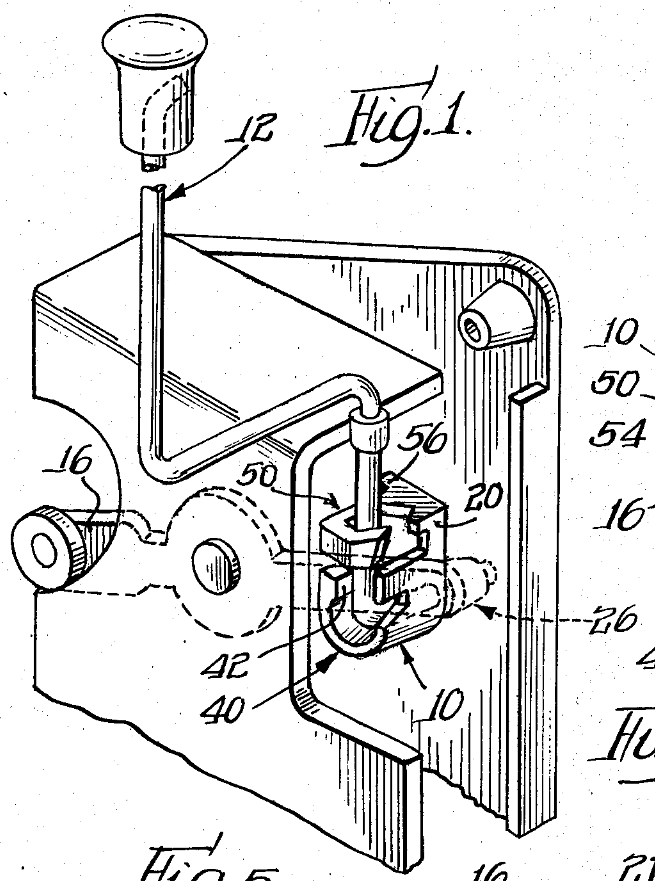
FIG. 1 is a perspective view in partial section showing an actuating rod coupled to a fastener embodying the present invention mounted in a door lock lever arm mechanism.

Referring now to the drawing, the fastener 10 is preferrably a one-piece thermoplastically molded product which can be fabricated from nylon or other similar materials which have the capacity of being rigid when formed in heavy sections and resilient when formed in thinner sections. The fastener 10 is used for retaining an elongated actuating rod 12 having a short substantially right angled end portion 14 to a lever member 16 having an aperture 18 therethrough. As an example of such functional use, FIG. 1 illustrates in a generalized fashion a door lock mechanism having a lever 16 apertured at both ends for accepting a fastener 10 or the like for retaining a rod 12 thereto. It should be recognized that fastener 10 can be utilized in any environment in which it is desired to connect an actuating rod to an apertured lever member. A similar application can be readily found in carburetor linkage arrangements.

Figure 5:
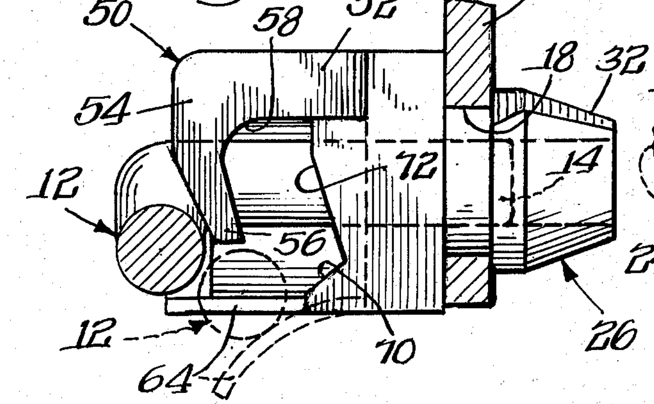
FIG. 5 is an end view taken along line 5—5 of FIG. 4 showing the lever arm in its initially inserted position and with a second position during the insertion procedure being shown in phantom.
Figure 4:
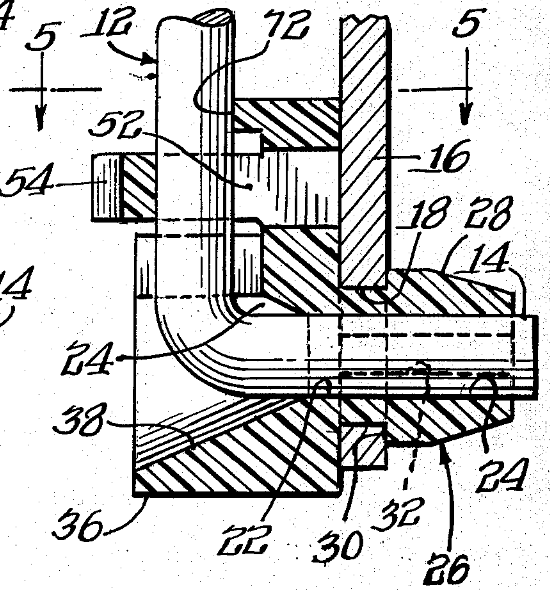
FIG. 4 is a side elevation in partial section as taken along line 4—4 in FIG. 2 with the addition of a sectional view of the lever arm of FIG. 1.
Figure 6:
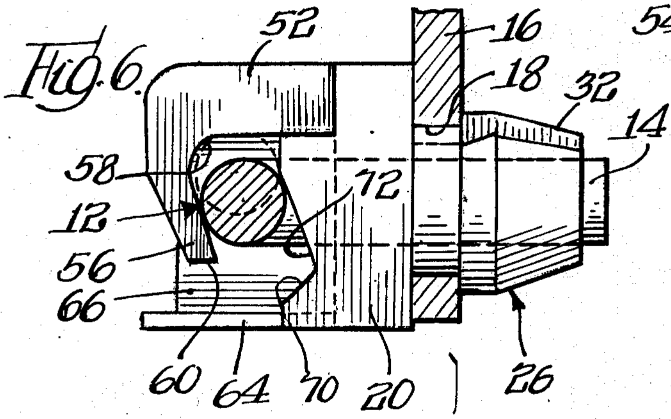
FIG. 6 is an end elevational view with the lever arm being in partial section showing the actuating rod in final mounted retained position with the absolute of movement being shown in phantom.

The fastener 10 has a generally rectangular flat base 20 having an aperture 22 at one end adapted to receive the actuating rod end portion 14. The material of the base 20 surrounding the aperture 22 is chamfered or countersunk as shown at 24 through substantially 360° of the aperture circumference, as will be expanded upon hereinafter. Extending outwardly from the underside of the base member 20 is a stud or retaining means 26 having a generally cylindrical configuration for acceptance within the aperture 18, a tapered nose portion 28 to facilitate introduction into the aperture 18 and a shoulder means 30 for engagement with the underside of the lever 16. One or more axially extending slots 32 are provided for resiliency during the compression of the retaining means or stud 26 as it is introduced telescopically within the aperture 18 of lever 16 until such time as the shoulder 30 passes through the hole and the fastener retaining means 26 resiliently expands into locked assembly as seen in FIGS. 4 through 6. While a stud or retaining means is an essential element to this invention, the particular configuration is a matter of choice to those skilled in the art since many forms are available, however, the preferred embodiment is a stud having a single axially extending slot 32 to provide a maximum circumferential extent of the shoulder 30 for engagement with lever arm 16 for maximizing the pull-out strength of the stud.

On the upper or opposite side of the base 20 there is provided a wall 36 which is generally U-shaped in configuration to form a receptacle 40 which is open at the top and at one end thereof. The inner surface 38 of the wall 36 is provided with a taper relative to the axis of the aperture 22 and the bore of fastener 26. This taper is substantially equal to the taper of the chamfer or countersink portion 24 of the base surrounding the aperture 22. On at least one side, in the preferred embodiment, the inner surface 38 of the wall 36 has a reentrant portion 42 which includes the tapered wall to thereby provide a funnel arrangement having an extent in excess of 180° communicating with a 360° funnel formed by the chamfer 24 in aperture 22. This funnel arrangement provides a lead-in guide for the end portion 14 into the aperture 22 and the bore 34 of the stud 26. The chamfer 24 also provides clearance for whatever inside radius is present at the 90° bend in the rod.

Figure 2:
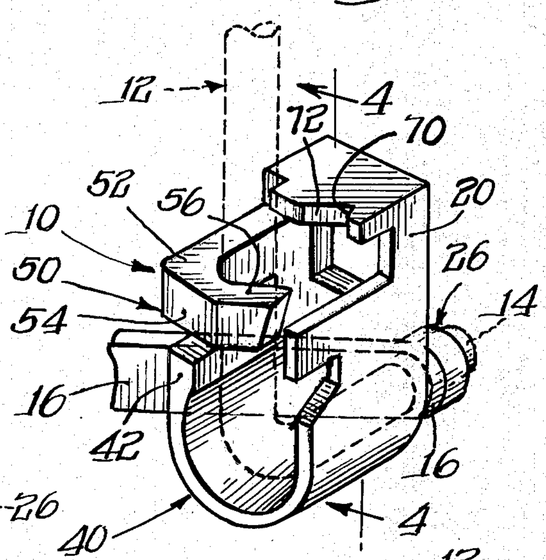
FIG. 2 is a perspective view of the preferred embodiment of the present invention from one side thereof with the actuating rod being shown in phantom for purposes of clarity in illustration.
Figure 3:
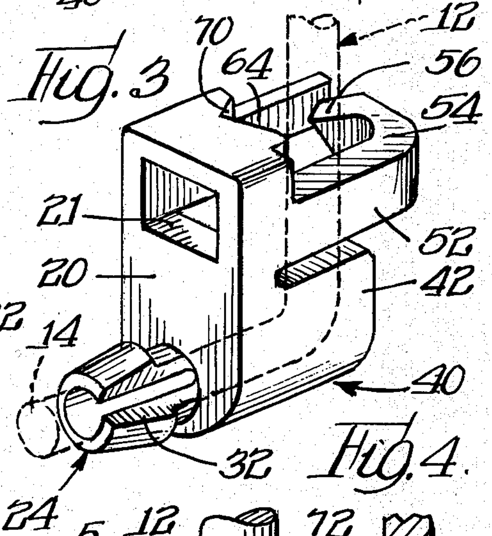
FIG. 3 is a perspective view of the fastener of the present invention as viewed from the opposite side of the fastener with the actuating rod being shown in phantom for purposes of clarity in illustration.

At the opposite end of the base is a retaining arm 50 having a first section 52 extending upwardly from one of the longitudinal edges of the base 20 and spaced from the aperture 22. The arm includes a second section 54 extending cantilever fashion from the first section 52 for a substantial portion of the width of the base 20. The free end 56 of the second section 54 is angularly disposed downwardly toward the base 20 to provide a bight 58 at the intersection of the first and second sections. The extremity 60 of the free end portion 56 is terminated on the bias or angularly disposed relative to the longitudinal edges of the base 20, as best seen in FIGS. 1 and 2 and as will be described further hereinafter. Extending upwardly from the opposite longitudinal edge is a flexible finger 64 which is in opposition to the extremity 60 of the arm 50 and forms a throat 66 having a nominal width less than the diameter of the actuating rod to be received therebetween. The flexible finger 64 preferably extends upwardly from the opposite side of the base a distance greater than the spacing between the extremity 60 and the base whereby when the end portion 14 of the rod is inserted into the aperture 22 and the co-axial bore 34 the main body portion of the rod is brought into engagement with the outer surface of the second section 54, it is guided down to the free end portion 56, aligned with the bias end 60 and brought to bear against the flexible finger 64, as best seen in FIG. 5. Continued axial pressure causes the finger 64 to flex outwardly, as shown in phantom in FIG. 5, thereby enlarging the throat 66 to accept the rod 12 into retained position under the second portion 56 into the bight formed between the first section 52 and the second section 56.

A further feature of the present invention is a cam surface 70 extending transversely of the longitudinal edges of the fastener 10 and positioned in space relation to the aperture 22. In the present embodiment, it is shown substantially co-planar with the end surface of the base 20 opposite the receptacle 40. The cam surface 70 serves as a lead or guide-in during the installation of the actuating rod within the fastener. While it is not mandatory to the operation of this fastener, it has been found desirable to add a second cam surface 72 having an opposite taper upwardly away from the base in the direction of the arm 50. Without such a second cam or ramp 72 it has been found that there is the tendency for the rod 12 to rattle between the bight 58 and the base 20 thereby causing a rattling which is annoying under certain circumstances and additionally places a repetitive wear against the shoulder 30. The second ramp or cam surface 72 urges the rod 12 into tight engagement under the second portion 54 and directs the rod 12 into the bight 58 thereby insuring positive retention of the rod.

The generalized installation of the rod 12 to the fastener 10, as has been previously pointed out, is usually in a blind area where the operator or installer cannot visually supervise his manual dexterity. The 360° funnel arrangement in the chamfer 24 as well as the continuation of the guide-in on the inner wall surface 38 guides the end portion 14 into the aperture 22 and bore 34. The ramp on the upper surfaces of the declining free end 56 of the retaining arm 50 guides the main body portion of the rod 12 into position for engagement. The flexible finger 64 deflects readily to permit easy rod insertion. Once installed, any force put against the base of this flexible finger by the rod will cause total clip-rod rotation within the aperture 18 of lever 16 with slight relative movement of the flexible finger 64, but not sufficiently to permit unintentional dislodgement of the rod 12 from its reained position. It will be noted that once the rod is installed under the second portion 54 of arm 50 that any load along the axis of end portion 14 will direct the arm 12 against the under surface of the angularly disposed end portion 56 which will cause the rod 12 to move into the bight 58, as best seen in FIG. 6 in phantom. This provides maximum retention by causing the rod to move into the most rigid arrangement relative to arm 50. In the event of the need for removal for repair purposes, this can be accomplished readily by restricting clip-rod rotation by finger pressure and assisting the deflection of the flexible member to a condition substantially as shown in phantom in FIG. 5 will permit ready removal of the rod for adjustment or repair. The substantially rigid arm 50 with its two sections 52 and 54 resist any axial load on the rod along the axis of the end portion 14. Lastly, the ramp or cam surface 72 minimizes the free axial movement of the actuating rod along the axis of the end portion 14 and thereby eliminates annoying rattles which might develop in a blind or hard to reach location.

To facilitate fabrication of this device in a two-plate mold without the necessity of side action cores, the base 20 may be apertured as at 21 to permit the formation of the underside of the arm 50.

It will be understood that the invention is not to be limited to the preferred embodiment shown and described, but that modifications and variations will be apparent to those skilled in the art without departing from the scope of the invention as defined in the appended claims.

I claim:

1. A one-piece plastic fastener for connecting an elongated actuating rod of a predetermined diameter terminating in a short substantially right angle end portion to an apertured lever member, said fastener including a generally rectangular base member having an aperture at one end thereof for accepting said end portion, a resilient retaining means extending from one side of said base and having a bore co-axial and communicating with said base aperture, said retaining means including shoulder means for cooperation with said lever member for retention of said fastener thereto, an upstanding wall extending from the opposite side of said base forming a receptacle open at the top and one end and encompassing said aperture, the base around said aperture being chamfered and said wall having a tapered inside surface which is substantially a continuation of said chamfer to provide a lead for said rod end portion to the base aperture and into the bore of the retaining means, a substantially rigid retaining arm including a first section extending from the opposite side of said base along one edge thereof in spaced relation to said aperture, a second section of said arm extending cantilever fashion over at least half the width of said base, said second section having upper and under surfaces, said surfaces in at least the free end portion of said second section being sloped toward the plane of said base and said slope terminating at the free end of said second section and the under surface being spaced from said base a distance a least equal to said predetermined diameter, a thin resilient finger extending from the opposite edge of said base in the same direction as the first section of said retaining arm in spaced relation to the free end of said second section of said arm, the distance between said resilient finger and the free end of said retaining arm being less than the predetermined diameter of said rod whereby said finger must be deflected laterally from the opposite side of said base away from said arm to permit said rod to be introduced into retained relation under said second section of said arm, and means for positioning said rod in predetermined relation to the under surface of said arm.

2. A fastener of the type claimed in claim 1 wherein said arm and finger have a greater height than said wall.

3. A fastener of the type claimed in claim 1 wherein the free end of said second section terminates on a bias falling on a plane passing through said aperture and angularly disposed relative to the edges of said base portion to guide said rod during insertion into said fastener.

4. A fastener of the type claimed in claim 1 wherein said means for positioning said rod under said retaining arm includes at least one cam surface rising transversely from said opposite side of said base toward said arm and spaced from said base aperture.

5. A fastener of the type claimed in claim 4 wherein a first cam surface ramp tapers from said finger toward the base and a second cam surface ramp tapers from the base toward the arm to position said rod in the bight formed at the intersection of the first and second sections of the arm thereby decreasing the possible vertical movement of the rod relative to the base and overlying arm.

6. A fastener of the type claimed in claim 4 wherein said cam surface tapers from said base toward said arm to position said rod in the bight of the arm.

7. A fastener of the type claimed in claim 1 wherein said base portion is apertured below the overhanging arm to permit its fabrication on a two-plate mold.

8. A one-piece plastic fastener for securing an elongated actuating rod of a predetermined diameter terminating in a substantially right angle end portion to an apertured lever member, said fastener including a substantially rectangular base member having an aperture at one end thereof for accepting said rod end portion, a resilient retaining means extending from one side of said base and having a bore co-axial with and communicating with said base aperture, said retaining means including shoulder means for cooperation with said lever member for retention of said fastener thereto, an upstanding wall extending generally normal to the opposite side of said base forming a generally U-shaped receptacle open at the top and one end thereof and encompassing at least 180° of said base aperture to receive said rod end portion, the base surrounding said aperture being countersunk and tapered into said aperture and said walls having a tapered inside surface which blends into said countersunk aperture through at last said 180° encirclement to positively lead said rod end portion into said base aperture and bore of said retaining means, a substantially rigid arm including a first section extending substantially normally from said opposite side of said base along one longitudinal edge thereof in spaced relation to said aperture, a second substantially rigid section of said arm extending cantilever fashion over a substantial portion of the width of said base, at least a substantial part of the free end of said second section being sloped toward said base to form a bight at the juncture of the first and second sections of said arm in opposition to said opposite side of said base, a resilient finger extending from the opposite longitudinal edge of said base in the same direction as the first section of said arm and terminating in opposed spaced relation to the free end of the second section of said arm to form a throat between said finger and arm free end with the spaced dimension of said throat being substantially less than the predetermined diameter of said rod, whereby said finger must be deflected laterally from the opposite side of said base away from said arm to permit said rod to be introduced into retained relation under said second section, cam means rising from said base opposite side and disposed in a plane extending normal to the two opposite longitudinal edges, said cam means tapering from said base to a high point adjacent to the first section of said arm to insure positionment of said rod with a restricted vertical movement relative to said bight and base.

9. A fastener of the type claimed in claim 8 wherein the upstanding wall tapered inside surface includes a reenterant portion to provide more than 180° encirclement to guide the elongated rod into alignment with said throat for introduction thereinto.

10. A fastener of the type claimed in claim 9 wherein the said finger extends away from said base a greater distance than the free end of said second section of the arm whereby said rod when introduced into said fastener will ride down the sloped portion of said arm into said throat and after deflection of said finger into retained position under said arm.

11. A fastener of the type claimed in claim 10 wherein the free end of said second section terminates on a bias to said longitudinal edges to accept said rod under said arm while the rod is angularly disposed relative to said longitudinal edges and thence angularly moved into final retained position substantially parallel to the edges of said fastener.

* * * * *